United States Patent
Tsai

(10) Patent No.: US 6,306,503 B1
(45) Date of Patent: Oct. 23, 2001

(54) MULTILAYER FLUOROPOLYMER FILMS WITH IMPROVED ADHESION

(75) Inventor: Mingliang Lawrence Tsai, Holmdel, NJ (US)

(73) Assignee: AlliedSignal Inc., Morris Township, NJ (US)

( * ) Notice: Subject to any disclaimer, the term of this patent is extended or adjusted under 35 U.S.C. 154(b) by 0 days.

(21) Appl. No.: 09/089,510

(22) Filed: Jun. 3, 1998

Related U.S. Application Data

(60) Provisional application No. 60/049,822, filed on Jun. 11, 1997.

(51) Int. Cl.$^7$ .................... B32B 25/08; B32B 27/08; B32B 27/28; B32B 27/30
(52) U.S. Cl. .................... 428/412; 428/421; 428/476.3; 428/483; 428/515; 428/516; 428/518; 428/519; 428/520; 428/522; 428/523
(58) Field of Search .................... 428/412, 421, 428/422, 476.3, 483, 515, 516, 518, 519, 520, 522, 523

(56) References Cited

U.S. PATENT DOCUMENTS

| | | | |
|---|---|---|---|
| 3,480,580 | 11/1969 | Joyner et al. | 260/29.6 |
| 3,481,910 | 12/1969 | Brunson | 260/78.4 |
| 4,317,860 | 3/1982 | Strassel | 428/421 |
| 4,510,301 | 4/1985 | Levy | 526/254 |
| 4,544,721 | 10/1985 | Levy | 526/249 |
| 4,612,155 | 9/1986 | Wong et al. | 264/176 |
| 4,632,959 | 12/1986 | Nagano | 525/70 |
| 4,677,017 | 6/1987 | DeAntonis et al. | 428/214 |
| 4,751,270 | 6/1988 | Urawa et al. | 525/244 |
| 5,082,742 | 1/1992 | Padwa | 428/515 |
| 5,139,878 | 8/1992 | Kim et al. | 428/421 |
| 5,741,840 | * 4/1998 | Lindquist et al. | 524/271 |
| 5,863,657 | * 1/1999 | Kawashima et al. | 428/421 |
| 5,874,035 | * 2/1999 | Tsai et al. | 264/173.13 |

FOREIGN PATENT DOCUMENTS

| | | |
|---|---|---|
| 0132583 | 2/1985 | (EP) . |
| WO 97/48553 | 12/1997 | (WO) . |
| WO 98/25762 | 6/1998 | (WO) . |

* cited by examiner

*Primary Examiner*—Paul Thibodeau
*Assistant Examiner*—Ramsey Zacharia
(74) *Attorney, Agent, or Firm*—Roger H. Criss

(57) ABSTRACT

Multilayer fluoropolymer films are formed from a layer of a fluoropolymer, a tie layer and a thermoplastic layer. The tie layer is a blend of an olefin-containing polymer, preferably at least one polyolefin having at least one functional moiety, such as an unsaturated carboxylic acid or anhydride thereof, and a styrene-containing polymer. Preferably, the fluoropolymer is a chlorotrifluoroethylene homopolymer or copolymer and the thermoplastic layer is a polyethylene. The preferred styrene-containing polymer is a styrene-ethylene-butylene-styrene block copolymer. These films exhibit increased adhesion between the layers as compared to a multilayer structure in which the tie layer is formed only from the olefin-containing polymer. The multilayer films are useful in packaging applications, including pharmaceutical packaging.

16 Claims, No Drawings

MULTILAYER FLUOROPOLYMER FILMS WITH IMPROVED ADHESION

CROSS-REFERENCE TO RELATED APPLICATIONS

This application claims the benefit of U.S. provisional patent application Ser. No. 60/049,822, filed Jun. 11, 1997.

BACKGROUND OF THE INVENTION

1. Field of the Invention

This invention relates to multilayer fluoropolymer films; and more particularly to films containing polychlorotrifluoroethylene (PCTFE) homopolymer or copolymer resin.

2. Description of the Prior Art

It is well known in the art to produce fluoropolymer films. These polymers are inert to most chemicals, resist high temperatures and have low coefficients of friction. Most fluoropolymers, especially PCTFE and ethylene-chlorotrifluoroethylene (ECTFE), exhibit excellent barrier properties, making them exceptionally good polymers as barrier packaging material. However, use of such fluoropolymers is restricted to specialty packaging applications due to their relatively high cost.

A suitable means of reducing the cost of a packaging material fabricated from a costly polymer is to form multilayer structures in which the polymer film is laminated with other, less costly, polymer films. This approach is particularly desirable for fluoropolymer packaging applications since a thin layer of the fluoropolymer is often all that is needed to take advantage of the desirable properties of fluoropolymers while minimizing the cost. However, fluoropolymers do not adhere strongly to most other polymers; in fact, most fluoropolymers are known for their non-stick characteristics.

Various attempts have been made to produce multilayer fluoropolymer films. For example, multilayer structures wherein at least one layer is a fluoropolymer and the other layer is a polyolefin or a thermoplastic homopolymer or copolymer, and particularly polyethylene terephthalate (PET), have been used for the production of highly oriented, dimensionally stable fluoropolymer films. In both structures, a tie layer or intermediate adhesive layer is utilized to provide good bonding between the film layers. Such multilayer structures are preferably coextruded and thereafter stretched in one or two directions. Multilayer films containing PCTFE and thermoplastic polymer layers have been proposed; see, for example, U.S. patent application Ser. No. 08/690,712, filed Jul. 31, 1996 and U.S. patent application Ser. No. 08/763,138, filed Dec. 10, 1996, the disclosure of which is expressly incorporated herein by reference.

Although the multilayer structures described above have excellent properties, including mechanical strength, toughness and water vapor barrier capabilities, in some instances multilayer films having greater adhesion between the layers is required. It would therefore be desirable to provide a multilayer structure having improved adhesion between the PCTFE or other fluoropolymer layer and the thermoplastic layer.

SUMMARY OF THE INVENTION

In accordance with this invention, there is provided a multilayer film which comprises at least one fluoropolymer layer and at least one thermoplastic layer comprising a thermoplastic homopolymer or copolymer, attached to a surface of the fluoropolymer layer by an intermediate adhesive layer. The intermediate adhesive layer comprises a blend of (1) an olefin-containing polymer selected from the group consisting of at least one functionalized polyolefin; at least one copolymer of ethylene and at least one comonomer selected from the group consisting of acrylic acid, alkyl acrylic acid, acrylates and alkyl acrylates; and blends thereof and (2) a styrene-containing rubber. Preferably, the rubber is a hydrogenated styrene-butadiene-styrene block copolymer, also referred to as a styrene-ethylene-butylene-styrene block copolymer.

It has been unexpectedly found that the presence of a relatively small amount of the styrene-containing rubber in the intermediate adhesive layer greatly increases the adhesion of the fluoropolymer and thermoplastic layers over a similar structure in which only the functionalized polyolefin is used as the intermediate adhesive layer.

DESCRIPTION OF THE PREFERRED EMBODIMENTS

The multilayer film structure of the present invention comprises at least one fluoropolymer layer and at least one thermoplastic layer comprising at least one thermoplastic homopolymer or copolymer attached to the surface of the fluoropolymer layer by an intermediate adhesive layer. The multilayer film structure provides superior adhesive properties.

Fluoropolymers suitable to form the fluoropolymer layer of the multilayer film of the present invention include, but are not limited to, ECTFE copolymer, ethylene-tetrafluoroethylene copolymer, fluorinated ethylene-propylene copolymer, perfluoroalkoxyethylene, PCTFE, polytetrafluoroethylene, polyvinylfluoride, polyvinylidene fluoride, and copolymers and blends thereof. Particularly preferred fluoropolymers include homopolymers and copolymers of chlorotrifluoroethylene and copolymers of ECTFE. Such copolymers may contain up to 10%, and preferably up to 8% by weight of other comonomers, such as vinylidene fluoride and tetrafluoroethylene. Most preferred fluoropolymers are chlorotrifluoroethylene homopolymers and copolymers of chlorotrifluoroethylene and vinylidene fluoride and/or tetrafluoroethylene, which are available from AlliedSignal Inc. as Aclon® fluoropolymer resins. Fluoropolymer film layers are described, for example, in U.S. Pat. Nos. 4,510,301; 4,544,721 and 5,139,878.

Also present in the multilayer structure is a layer of a thermoplastic homopolymer or copolymer. The thermoplastic layer non-exclusively includes a material selected from the group consisting of polyolefins, polyamides, polyesters, polystyrene, polycarbonates, vinyl polymers, and copolymers and blends thereof Preferably, the thermoplastic layer is a polyolefin, preferably a poly(α-olefin) or copolymers or blends thereof, wherein the α-olefin monomers have from about 2 to about 10 and preferably from about 2 to about 6 carbon atoms. Non-limiting examples of polyolefins include polyethylenes, including ultralow, low, linear low, medium, high and ultrahigh density polyethylene; polypropylene; polybutylene; polybutene-1; polypentene-1;poly-3-methylbutene-1; poly-4-methylpentene-1; polyhexene; copolymers of polyolefins; copolymers of olefins and other polymers such as polyvinyl chloride, polystyrene and polyurethane, etc., and mixtures of these.

Between the fluoropolymer layer and the thermoplastic layer is an adhesive layer, also referred to in the art as a "tie" layer. In accordance with the present invention, the tie layer comprises a blend of polymeric materials, namely (1) an olefin-containing polymer selected from the group consisting of at least one functionalized polyolefin; at least one copolymer of ethylene and at least one comonomer selected from the group consisting of acrylic acid, alkyl acrylic acid, acrylates and alkyl acrylates; and blends thereof and (2) a styrene-containing rubber. One type of olefin-containing polymer is a functionalized olefin polymer which contains at least one functional moiety. Among the functional moieties that may be employed are unsaturated carboxylic acids, unsaturated carboxylic acid anhydrides, amines and epoxies. Examples of olefins employable for the preparation of the modified polyolefins include homopolymers or copolymers of an α-olefin such as ethylene, propylene, butene-1, pentene-1, hexene-1, 4-methyl-pentene-1 and octene-1. Unsaturated carboxylic acids and anhydrides useful to modify the polyolefins include maleic acid and anhydride, fumaric acid and anhydride, crotonic acid and anhydride, citraconic acid and anhydride, itaconic acid and anhydride and the like. Of these, the most preferred is maleic anhydride. Suitable amines include aliphatic or aromatic, primary, secondary and tertiary amines, such as 2,4,6-tribromoaniline, methylamine, ethylamine, propylamine, dimethylamine, N-methylaniline, ethylmethylamine, 2-(N-methylamine)heptane, sec-butyldimethylamine, N-ethyl-N-methylaniline, trimethylamine, N,N-dimethylanaline, and the like. Suitable epoxies include those having from about 2 to about 20 carbon atoms. The modified polyolefins suitable for use in this invention include compositions described in U.S. Pat. Nos. 3,481,910; 3,480,580; 4,612,155 and 4,751,270 which are incorporated herein by reference.

The preferred modified polyolefin composition comprises from about 0.001 and about 10 weight percent of the functional moiety, based on the total weight of the modified polyolefin. More preferably, the functional moiety comprises from about 0.005 and about 5 weight percent, and most preferably from about 0.01 and about 2 weight percent.

Another type of olefin-containing polymer useful herein is a copolymer of ethylene and acrylic acid, alkyl acrylic acid, acrylates and/or alkyl acrylates. The alkyl acrylic acids or alkyl acrylates contain alkyl groups preferably of from about 2 to about 4 carbon atoms. Preferred among these types of polymer is an ethylene methyl acrylate copolymer.

The tie layer also includes a styrene-containing rubber. These rubbers preferably are styrene block copolymers, such as hydrogenated styrene-butadiene-styrene block copolymers, also referred to as styrene-ethylene-butylene-styrene (SEBS) block copolymers. Other polymeric materials may be present in the tie layer, such as high melt viscosity polyolefins.

It has been found that the presence of even a minor amount of the styrene-containing rubber greatly increases the adhesion between the fluoropolymer and thermoplastic layers. The styrene-containing rubber may comprise, for example, from about 1 to about 35%, and more preferably from about 5 to about 20%, by weight based on the total weight of the tie layer.

The multilayer structures may be prepared in any conventional manner. Preferably, the layers are coextruded using cast or blown film techniques and conventional temperature and other conditions for the polymers of the multilayer film, such as from about 250 to about 400° C. Alternatively, the layers could be formed by laminating the layers together.

The multilayer film may be oriented in a monoaxial or biaxial direction using methods known in the art. Also, the number of layers in the multilayer film can be adjusted to meet the requirements of a particular end use application so long as there is an adhesive layer between each polymer layer. For example, a five layer structure may be provided with the layers comprising polyethylene-tie-fluoropolymer (e.g., PCTFE)-tie-polyethylene. Additionally, the multilayer film of this invention may be of any conventional thickness, such as a total thickness of from about 0.1 to about 25 mils. The thickness of each layer may vary, and may range, for example, from about 0.05 to about 10 mils. These are only several of the many combinations of thickness and order of layers of the fluoropolymer and thermoplastic polymers that can be made. Of course, any variation of the order and thickness is contemplated.

The invention is more easily understood by reference to specific embodiments which are representative examples according to the teachings of the present invention. It must be understood however, that the specific embodiments discussed herein are provided only for the purpose of illustration, and not by way of limitation, and it is further understood that the invention may be practiced otherwise than specifically described and yet be within the inventive scope.

EXAMPLE 1

A three-layer multilayer film was coextruded from PCTFE homopolymer (Aclon HP1120 from AlliedSignal Inc.), linear low density polyethylene (Dowlex 2045A from Dow Chemical Company) and a tie layer which was a blend of (1) a functionalized polyolefin (Admer SF700A from Mitsui Chemicals America, Inc., containing by weight 68% ethylene, 25% propylene, 7% vinyl acetate and less than 1% maleic anhydride) and (2) a styrene-ethylene-butylene-styrene block copolymer (Kraton G1657 rubber from Shell Chemical Company). The rubber was present in an amount of 10% by weight of the total weight of the blend. The multilayer structure was coextruded and cast onto a casting roll whose temperature was maintained at 62° F. (17° C.) with the polyethylene layer facing the casting roll.

The bond strength of the multilayer film was determined by an adhesive tape peel test (ASTM F904) using Scotch 610 tape as backing, with a 12 inch (30.5 cm) per minute, 180 degree peel, with the PCTFE layer on top. The average bond strength was over 600 gm/in. (236 gm/cm) with tape on both sides, and 360 gm/in. (142 gm/cm) with tape only on the PCTFE side. In comparison, a multilayer film produced under similar conditions but only employing the Admer SF700A material as the tie layer resulted in average bond strengths of 370 gm/in. (147 gm/cm) with tape on both sides and 220 gm/in. (87 gm/cm) with tape on the PCTFE side only. It can be seen that the presence of the styrene-containing rubber in the tie layer greatly improves the bond strength of the multilayer structure.

EXAMPLE 2

Example 1 was repeated utilizing several types of styrene rubber, with the casting roll temperature being 80° .F (27° C.). The data obtained are set forth below in Table 1:

TABLE 1

| Tie Resin Formulation | | | Bond Strength gm/in (gm/cm) | |
|---|---|---|---|---|
| Base Polymer | Styrene Rubber % | Styrene Rubber Type | Tape On PCTFE Side Only | Tape on Both Sides |
| mPE[1], 100% | — | — | 198 (78) | 303 (119) |
| mPE[1], 90% | 10% | (SEBS), linear[2] | 221 (87) | 340 (134) |
| mPE[1], 80% | 20% | (SEBS), linear[2] | 292 (115) | 584 (230) |
| mPE[1], 95% | 5% | (SEBS), diblock[3] | 260 (102) | 520 (205) |
| mPE[1], 90% | 10% | (SEBS), diblock[3] | 320 (126) | 603 (237) |
| mPE[1], 80% | 20% | (SEBS), diblock[3] | 315 (124) | 650 (256) |
| mPE[1], 90% | 10% | (SEBS), linear 1% maleation[4] | 219 (86) | 359 (141) |

[1]= Admer SF700A modified polyethylene
[2]= Kraton G1650
[3]= Kraton G1657 (35% diblock, 65% linear)
[4]= Kraton FG1921X As can be seen from Table 1, diblock SEBS was most effective in enhancing adhesion.

EXAMPLE 3

Example 1 was repeated except that the base polymer in the tie layer resin was changed and the casting roll temperature was 80° F. (27° C.). The tie layer resin comprising 90% ethylene methacrylate copolymer (EMAC 2202 from Chevron Chemical Company), and 10% diblock SEBS rubber (Kraton G1657). This structure exhibited an average bond strength of 575 gm/in (226 gm/cm) with tape on both sides and 183 gm/in (72 gm/cm) with tape only on the PCTFE side. In comparison, a multilayer film using only the ethylene methacrylate copolymer as the tie layer had an average bond strength of 321 gm/in (126 gm/cm) both sides and 156 gm/in (61 gm/cm) only on the PCTFE side.

EXAMPLE 4

Example 1 was repeated except that a poly(ethylene chlorotrifluoroethylene) alternating block copolymer (Halar 500 from Ausimont USA, Inc.) fluoropolymer was utilized and the P(ECTFE) was in contact with the casting roll. Additionally, the tie layer resin comprised a blend of 75% Admer SF700A (with a melt flow rated per ASTM D1238 at 190° C. of 1.0), 15% Admer AT1276 (also from Mitsui Chemicals America, Inc., same composition as Admer SF700A, with a melt flow rate of 0.4–0.6), and 10% Kraton G1657 (diblock SEBS).

The films exhibited 550 gm/in (217 gm/cm) bond strength with tape on both sides and 350 gm/in (138 gm/cm) with tape on one side. In contrast, the P(ECTFE) fluoropolymer films exhibited a bond strength of 455 gm/in (179 gm/cm) with tape on both sides and 250 gm/in (98 gm/cm) with tape on one side only.

It can be seen that the present invention provides a multilayer fluoropolymer structure which has improved adhesion between the fluoropolymer layer and a thermoplastic layer. Such structures also exhibit excellent mechanical strength, toughness and water vapor barrier properties, and preferably are also clear structures so that the contents of a package can be seen.

These types of structures can be used in various applications, including packaging. One type of packaging particularly suitable for the multilayer fluoropolymer structure of this invention is a pharmaceutical package for medication and the like. In this type of package, typically the fluoropolymer structure is laminated to a polyvinylchloride (PVC) layer using a suitable adhesive and optionally a layer of a polyolefin, with the thermoplastic layer (e.g., polyethylene) facing the PVC layer. This laminated structure is then thermoformed to a desired shape with the fluoropolymer (e.g., PCTFE) on the outside of the laminated structure, filled with medication (such as pills) and an aluminum foil is adhered to the PVC layer.

What is claimed is:

1. A multilayer film which comprises at least one fluoropolymer layer selected from the group consisting of chlorotrifluoro ethylene homopolymers, chlorotrifluoro ethylene-containing copolymers and blends thereof, and at least one thermoplastic layer comprising at least one thermoplastic homopolymer or copolymer, attached to a surface of the fluoropolymer layer by an intermediate adhesive layer, said intermediate adhesive layer comprising a blend of (1) an olefin-containing polymer selected from the group consisting of at least one functionalized polyolefin; at least one copolymer of ethylene and at least one comonomer selected from the group consisting of acrylic acid, alkyl acrylic acid, acrylates, and alkyl acrylates; and blends thereof and (2) a styrene-ethylene-butylene-styrene block copolymer.

2. The multilayer film of claim 1 wherein said styrene-containing rubber is present in an amount of about 1 to about 35 percent by weight based on the total weight of said adhesive layer.

3. The multilayer film of claim 1 wherein said styrene-containing rubber is present in an amount of about 5 to about 20 percent by weight based on the total weight of said adhesive layer.

4. The multilayer film of claim 1, wherein said styrene-ethylene-butylene-styrene block copolymer is diblock styrene-ethylene-butylene-styrene copolymer.

5. The multilayer film of claim 1 wherein said olefin-containing polymer is at least one functionalized polyolefin.

6. The multilayer film of claim 5 wherein said functionalized polyolefin contains at least one functional moiety selected from the group consisting of unsaturated carboxylic acids, unsaturated carboxylic acid anhydrides, amines and epoxies.

7. The multilayer film of claim 6 wherein said functionalized polyolefin has at least one functional moiety of an unsaturated carboxylic acid or anhydride thereof.

8. The multilayer film of claim 7 wherein said functional moiety is maleic anhydride.

9. The multilayer film of claim 1 wherein said functionalized polyolefin comprises a polyethylene.

10. The multilayer film of claim 1 wherein said olefin-containing polymer comprises at least one copolymer of ethylene and at least one comonomer selected from the group consisting of acrylic acid, alkyl acrylic acid, acrylates, and alkyl acrylates.

11. The multilayer film of claim 10 wherein said olefin-containing polymer is ethylene methyl acrylate copolymer.

12. The multilayer film of claim 1 wherein said fluoropolymer is a chlorotrifluoro-ethylene homopolymer.

13. The multilayer film of claim 1 wherein said thermoplastic layer comprises a material selected from the group consisting of polyolefins, polyamides, polyesters, polystyrene, polycarbonates, vinyl polymers, and copolymers and blends thereof.

14. The multilayer film of claim 1 wherein said thermoplastic layer comprises a polyethylene.

15. A pharmaceutical packaging material which comprises a multilayer film which comprises at least one fluoropolymer layer selected from the group consisting of chlorotrifluoro ethylene homopolymers, chlorotrifluoro ethylene-containing copolymers and blends thereof, and at least one thermoplastic layer comprising at least one thermoplastic homopolymer or copolymer, attached to a surface of the fluoropolymer layer by an intermediate adhesive layer, said intermediate adhesive layer comprising a blend of (1) an olefin-containing polymer selected from the group consisting of at least one functionalized polyolefin; at least one copolymer of ethylene and at least one comonomer selected from the group consisting of acrylic acid, alkyl acrylic acid, acrylates, and alkyl acrylates; and blends thereof and (2) a styrene-ethylene-butylene-styrene block copolymer.

16. The pharmaceutical packaging material of claim 15 which is laminated to a layer of polyvinylchloride.

* * * * *